US012812506B2

(12) United States Patent
Diao et al.

(10) Patent No.: US 12,812,506 B2
(45) Date of Patent: Nov. 24, 2026

(54) SYSTEMS AND METHODS FOR MOBILE NODE INTER-CU MIGRATION

(71) Applicant: ZTE Corporation, Guangdong (CN)

(72) Inventors: Xueying Diao, Shenzhen (CN); Lin Chen, Shenzhen (CN); Ying Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 156 days.

(21) Appl. No.: 18/765,752

(22) Filed: Jul. 8, 2024

(65) Prior Publication Data

US 2024/0381223 A1 Nov. 14, 2024

Related U.S. Application Data

(63) Continuation of application No. PCT/CN2022/071284, filed on Jan. 11, 2022.

(51) Int. Cl.
*H04W 36/12* (2009.01)
*H04W 40/36* (2009.01)
*H04W 84/04* (2009.01)

(52) U.S. Cl.
CPC .......... *H04W 40/36* (2013.01); *H04W 84/047* (2013.01)

(58) Field of Classification Search
CPC ............... H04W 92/20; H04W 84/047; H04W 36/08; H04W 76/19; H04W 88/085; H04W 36/0033; H04W 36/0064; H04W 36/087; H04W 36/38; H04W 16/26; H04W 36/0055; H04W 36/0077; H04W 36/12; H04W 36/305; H04W 36/362; H04W 24/02; H04W 24/04; H04W 24/10; H04W 36/00; H04W 36/0016; H04W 36/0019; H04W 36/0058; H04W 36/0085; H04W 40/22; H04W 76/11; H04W 12/04; H04W 12/041; H04W 12/0431; H04W 12/0433; H04W 12/106; H04W 16/28; H04W 24/08; H04W 36/0009; H04W 36/0011; H04W 36/0038; H04W 36/0044; H04W 36/0061;

(Continued)

(56) References Cited

U.S. PATENT DOCUMENTS 12,294,895 B2 * 5/2025 Liu .................. H04W 36/0033
2019/0320352 A1 10/2019 Lee et al.

(Continued)

FOREIGN PATENT DOCUMENTS

CN 109803453 A 5/2019
CN 113455048 A 9/2021

(Continued)

OTHER PUBLICATIONS

3rd Generation Partnership Project; Technical Specification Group Radio Access Network; Study on Integrated Access and Backhaul; (Release 15), 3GPP TR 38.874 1.0.0 (Dec. 2018), 111 pages.

(Continued)

*Primary Examiner* — Linh V Nguyen
(74) *Attorney, Agent, or Firm* — Foley & Lardner LLP

(57) ABSTRACT

Presented are systems and methods for mobile node inter-CU migration. A first network node can send configuration information to a second network node. The configuration information may be associated with a mobile node transitioning from a source node to a target node.

20 Claims, 10 Drawing Sheets

(58) Field of Classification Search

CPC ....... H04W 36/0069; H04W 36/00695; H04W 36/0079; H04W 36/0094; H04W 36/02; H04W 36/142; H04W 36/185; H04W 36/22; H04W 36/24; H04W 36/249; H04W 36/302; H04W 36/304; H04W 40/24; H04W 40/34; H04W 48/20; H04W 56/004; H04W 60/06; H04W 74/006; H04W 74/0833; H04W 76/12; H04W 76/20; H04W 76/22; H04W 76/27; H04W 76/28; H04W 76/34; H04W 8/22; H04W 8/26; H04W 80/02; H04W 84/06; H04W 88/06

USPC .................................. 455/421, 422.1, 432.1

See application file for complete search history.

(56) References Cited

U.S. PATENT DOCUMENTS

| | | | | |
|---|---|---|---|---|
| 2021/0099385 | A1 | 4/2021 | Huang et al. | |
| 2021/0274404 | A1* | 9/2021 | Koziol | H04W 36/0094 |
| 2022/0014976 | A1 | 1/2022 | Luo et al. | |
| 2022/0022116 | A1* | 1/2022 | Hasegawa | H04W 16/26 |
| 2022/0141732 | A1* | 5/2022 | Wu | H04W 36/0077<br>370/331 |
| 2023/0118291 | A1* | 4/2023 | Wang | H04W 36/0055<br>370/331 |
| 2023/0262790 | A1* | 8/2023 | Liu | H04W 76/11<br>370/329 |
| 2023/0300683 | A1* | 9/2023 | Ozturk | H04W 36/0016 |
| 2023/0300685 | A1* | 9/2023 | Xu | H04W 36/00<br>455/436 |
| 2023/0319544 | A1* | 10/2023 | Wang | H04L 61/5007<br>370/329 |
| 2024/0073762 | A1* | 2/2024 | Liu | H04W 12/0433 |
| 2024/0179792 | A1* | 5/2024 | Höglund | H04W 76/28 |
| 2024/0340678 | A1* | 10/2024 | Koll?R | H04W 76/20 |

FOREIGN PATENT DOCUMENTS

| | | | |
|---|---|---|---|
| CN | 113812207 | A | 12/2021 |
| WO | WO-2020/039346 | A1 | 2/2020 |
| WO | WO-2020/191768 | A1 | 10/2020 |
| WO | WO-2021/091083 | A1 | 5/2021 |

OTHER PUBLICATIONS

Extended European Search Report for EP Appl. No. 22919345.3, dated Feb. 13, 2025 (9 pages).

Ericsson, “Transport of UP data—Introduction of E-UTRA PDCP in NR UP protocol”, 3GPP TSG-RAN WG3 Meeting #113-e, R3-214347, Aug. 26, 2021, Online (20 pages).

International Search Report and Written Opinion for PCT Appl. No. PCT/CN2022/071284 mailed Sep. 2022 (7 pages).

3rd Generation Partnership Project, “Technical Specification Group Radio Access Network; NG-RAN; E1 Application Protocol (E1AP) (Release 16)”, 3GPP TS 38.463 V16.2.0, Jul. 202 (230 pages).

3rd Generation Partnership Protect, “Technical Specification Group Radio Access Network; NG-RAN; NG Application Protocol (NGAP) (Release 16)”, 3GPP TS 38.413 V16.2.0, Jul. 2020 (462 pages).

3rd Generation Partnership Project, “Technical Specification Group Radio Access Network; NG-RAN; Xn application protocol (XnAP) (Release 16)”, 3GPP TS 38.423 V16.2.0, Jul. 2020 (447 pages).

Office Action on KR Appl. No. 10-2024-7023271 dated Sep. 16, 2026 (12 pages with English translatino).

ZTE, “Furhter consideration on inter-donor migration”, 3GPP TSG RAN WG3 #112-e, R2-212037. May 17-28, 2021, e-Meeting (12 pages).

* cited by examiner

SYSTEMS AND METHODS FOR MOBILE NODE INTER-CU MIGRATION

CROSS-REFERENCE TO RELATED APPLICATION

This application claims the benefit of priority under 35 U.S.C. § 120 as a continuation of International Patent Application No. PCT/CN2022/071284, filed on Jan. 11, 2022, the disclosure of which is incorporated herein by reference in its entirety.

TECHNICAL FIELD

The disclosure relates generally to wireless communications, including but not limited to systems and methods for mobile node inter-CU migration.

BACKGROUND

In the 5th Generation (5G) New Radio (NR) mobile networks, a user equipment (UE) can communicate with or access one or more nodes (e.g., access nodes) within a network. The UE can access the access node via a respective access link. At least one node among various access nodes may include a wired connection to a core network. The UE may connect directly to the node with a wired connection for fiber transport. The UE may connect and transmit data to an access node, where the access node can forward the data to a donor node via a wireless backhaul link. The donor node can include the wired connection to the core network for data communication.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A first network node can send configuration information to a second network node. The configuration information can be associated with a mobile node transitioning from a source node to a target node.

In some implementations, the first network node can include the source node, and the second network node can include the target node. In some cases, the first network node may include the target node, and the second network node may include the source node. In some cases, the first network node can include the mobile node, and the second network node can include the source node or the target node. In some other cases, the first network node may include the source node or the target node, and the second network node may include the mobile node.

In some implementations, the source node may send, to the target node, at least one of: an identity (ID) of the mobile node, an indication of the mobile node that is to access the target node, a speed of the mobile node, a capability of the mobile node to support maintaining a F1 control plane (F1-C) connection of the mobile node at a particular network node that is different from that at which a F1 user plane (F1-U) tunnel of the mobile node is being maintained, or an indication that the F1-C connection of the mobile node is to be maintained at a centralized unit control plane (CU-CP) of the source node or a previous node, and a F1-U tunnel of the mobile node is to be maintained at a centralized unit user plane (CU-UP) of the target node, when the mobile node transitions from the source node to access the target node.

In some cases, the source node may receive, from the mobile node, at least one of: at least one of: a transport layer address for F1 or non-F1 traffic communication, at least one of: a downlink transport layer address, or a downlink tunnel endpoint identifier (TEID) associated with each general packet radio service (GPRS) tunneling protocol (GTP) tunnel, or at least one of: an IP security (IP-SEC) transport layer address, or a GTP transport layer address associated with the IP-SEC transport layer address. In some cases, the source node may receive an indication of successful access of the target node by the mobile node from the target node.

In some implementations, the source node may send an Xn application protocol (XnAP) message comprising first information to the target node. In some cases, the first information may include at least one of: an identity (ID) of the mobile node, an indication that the mobile node is able to move, an identity of a user equipment (UE), a list of protocol data unit (PDU) session resources to be setup, a downlink transport layer address, a downlink tunnel endpoint identifier (TEID) associated to each general packet radio service (GPRS) tunneling protocol (GTP) tunnel, a capability of the mobile node to support maintaining a F1 control plane (F1-C) connection of the mobile node at a particular network node that is different from that at which a F1 user plane (F1-U) tunnel of the mobile node is being maintained, or an indication that the F1-C connection of the mobile node is to be maintained at a centralized unit control plane (CU-CP) of the source node or a previous node, and a F1-U tunnel of the mobile node is to be maintained at a centralized unit user plane (CU-UP) of the target node, when the mobile node transitions from the source node to access the target node.

In some implementations, a centralized unit control plane (CU-CP) of the target node may send, to a centralized unit user plane (CU-UP) of the target node, at least one of: an identity (ID) of the mobile node, an indication that the mobile node is able to move, a capability of the mobile node to support maintaining a F1 control plane (F1-C) connection of the mobile node at a particular network node that is different from that at which a F1 user plane (F1-U) tunnel of the mobile node is being maintained, or an indication that the F1-C connection of the mobile node is to be maintained at the CU-CP of the source node or a previous node, and the F1-U tunnel of the mobile node is to be maintained at the CU-UP of the target node, when the mobile node transitions from the source node to access the target node. In some cases, the particular network node may include: the source node, the target node, or a previous node.

In some implementations, the source node may receive, from the target node, at least one of: an identity (ID) of the mobile node, an ID of a user equipment (UE), at least one of: data radio bearer (DRB) information, information on flows mapped to DRB, or uplink transport network layer (TNL) information of each F1 user plane (F1-U) tunnel, at least one of: a list of protocol data unit (PDU) session resources to be switched in downlink, a PDU session ID, a downlink next generation (NG) user plane interface (NG-U) user plane (UP) TNL information, or a list of quality-of-service (QoS) flow accepted, or an ID of a centralized unit user plane (CU-UP) of the target node.

In some implementations, the source node can send, to a network function or entity of a core network, at least one of: an identity (ID) of the mobile node, an indication that the mobile node is able to move, an ID of a user equipment (UE), at least one of: a list of protocol data unit (PDU) session resources to be switched in downlink, a PDU session ID, a downlink next generation (NG) user plane interface (NG-U) user plane (UP) TNL information, or a list of quality-of-service (QoS) flow accepted, an indication that a F1 control plane (F1-C) connection of the mobile node is to be maintained at a centralized unit control plane (CU-CP) of the source node or a previous node, and a F1-U tunnel of the mobile node is to be maintained at a centralized unit user plane (CU-UP) of the target node, when the mobile node transitions from the source node to access the target node, or an ID of the CU-UP of the target node.

In some cases, the CU-CP of the target node may send to the CU-UP of the target node at least one of: an identity (ID) of the mobile node, an ID of a user equipment (UE), at least one of: downlink transport layer address, or a tunnel end-point identifier (TEID) associated to each general packet radio service (GPRS) tunneling protocol (GTP) tunnel, a protocol data unit (PDU) session ID, or an uplink next generation (NG) user plane interface (NG-U) user plane (UP) TNL information. In some cases, the source node may send an identity of a node that the mobile node initially accessed, or an identity of a node at which a F1 control plane interface (F1-C) of the mobile node is terminated to the target node. In some cases, the node may receive an indication of successful access of the target node by the mobile node from the target node.

In some implementations, the source node can receive an Xn application protocol (XnAP) message to release context related to the mobile node or a wireless communication device from a previous node. The previous node may include a node that the mobile node initially accessed, or a node at which a F1 control plane interface (F1-C) of the mobile node is terminated. In some cases, the target node may send to the source node to release the context related to the mobile node or a wireless communication device.

In some implementations, the source node may send to a previous node at least one of: an indication that the mobile node has accessed the target node, or an identity of the target node. The previous node may include a node that the mobile node initially accessed, or a node at which a F1 control plane interface (F1-C) of the mobile node is terminated.

At least one aspect is directed to a system, method, apparatus, or a computer-readable medium. A second network node can receive configuration information from a first network node. The configuration information may be associated with a mobile node transitioning from a source node to a target node.

At least one aspect is directed to a system, method, apparatus, or a computer-readable medium. A first network node can send information to a second network node. The information may include a capability of the first network node to support maintaining a F1 control plane (F1-C) connection of a third node at a fourth network node that is different from that at which a F1 user plane (F1-U) tunnel of the third node is being maintained.

In some cases, at least one of: the first network node may include a centralized unit user plane (CU-UP) of a radio access network (RAN) node, and the second network node may include a centralized unit control plane (CU-CP) of the RAN node, the first network node may include a CU-CP of the RAN node, and the second network node may include a network function or entity of a core network, the third node may include a mobile node, fourth node may include the first network node or the second network node, or fourth node may be different from the first network node and the second network node.

In some implementations, the first or second node can receive a first capability of the third network node from the third network node. In some cases, the first capability can include a capability to support maintaining a F1 control plane (F1-C) tunnel of the third node at a particular network node that is different from that at which a F1 user plane (F1-U) tunnel of the third node is being maintained. In some implementations, receiving the first capability of the third node can include receiving the first capability via a radio resource control (RRC) message or a F1 application protocol (F1AP) message.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

1. Mobile Communication Technology and Environment

Figure 1:
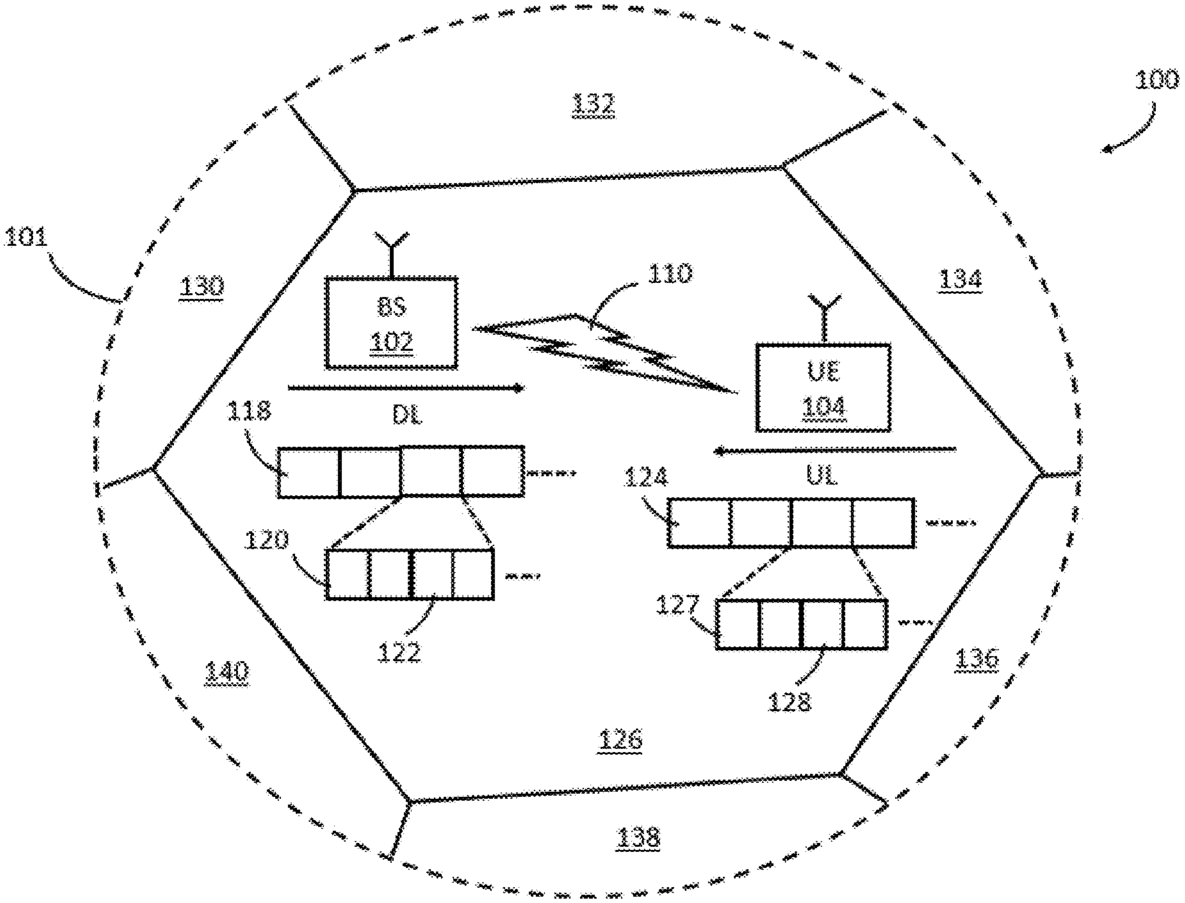
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
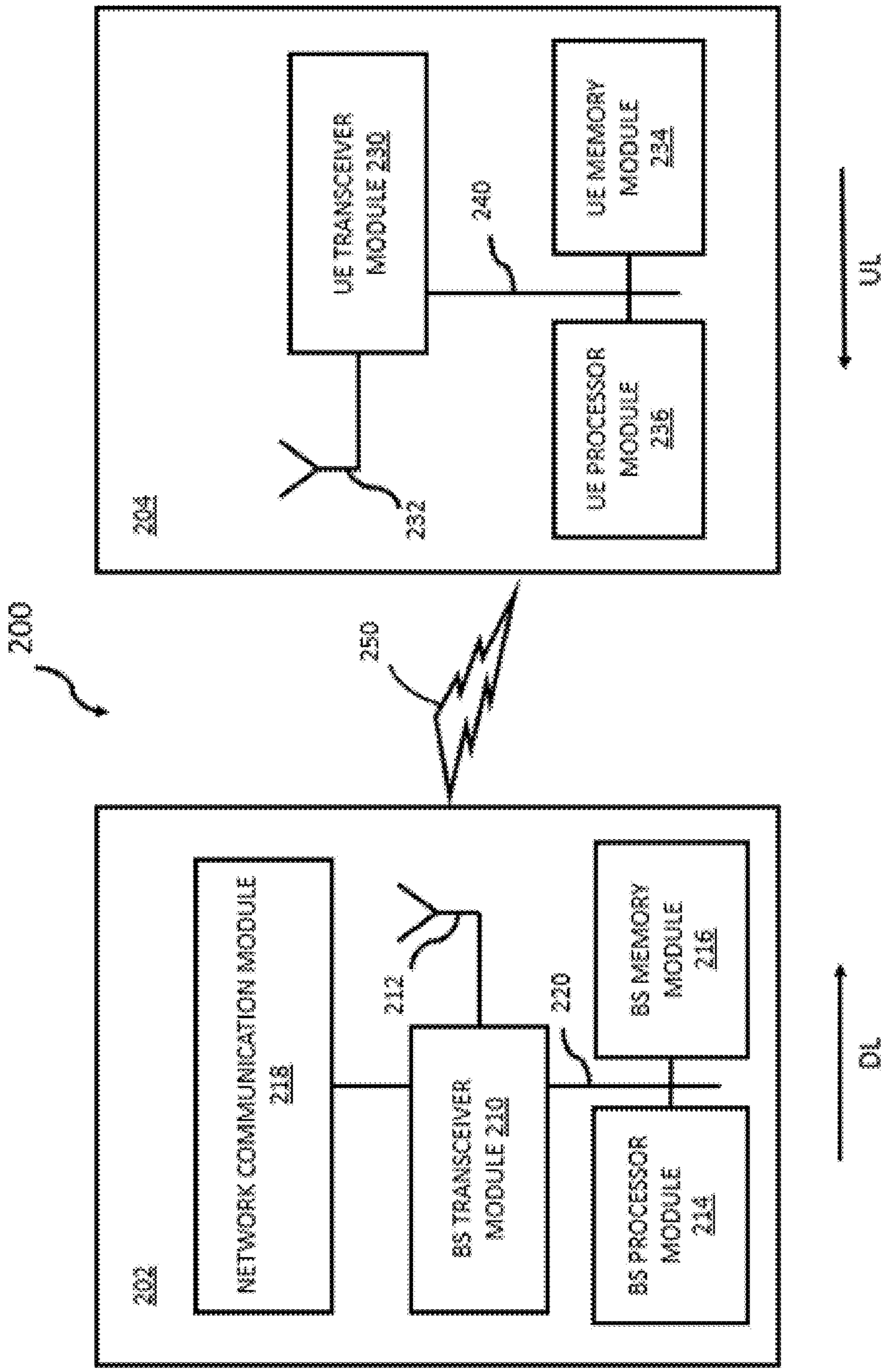
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Mobile IAB-Node Inter-CU Migration

In certain systems (e.g., 5G new radio (NR), Next Generation (NG) systems, 3GPP systems, and/or other systems), such as in comparison to long-term evolution (LTE), NR may include/have a larger available bandwidth. The utilization of massive multiple-input/multiple-output (MIMO) and multi-beam facilitates and enables the research and application/integration/adoption of integrated access and backhaul links (IAB). The use of backhaul links and/or relay links can increase/enhance/improve the flexibility of dense NR cell networks deployment, without a need or requirement to increase the dense deployment of transmission networks.

Figure 3:
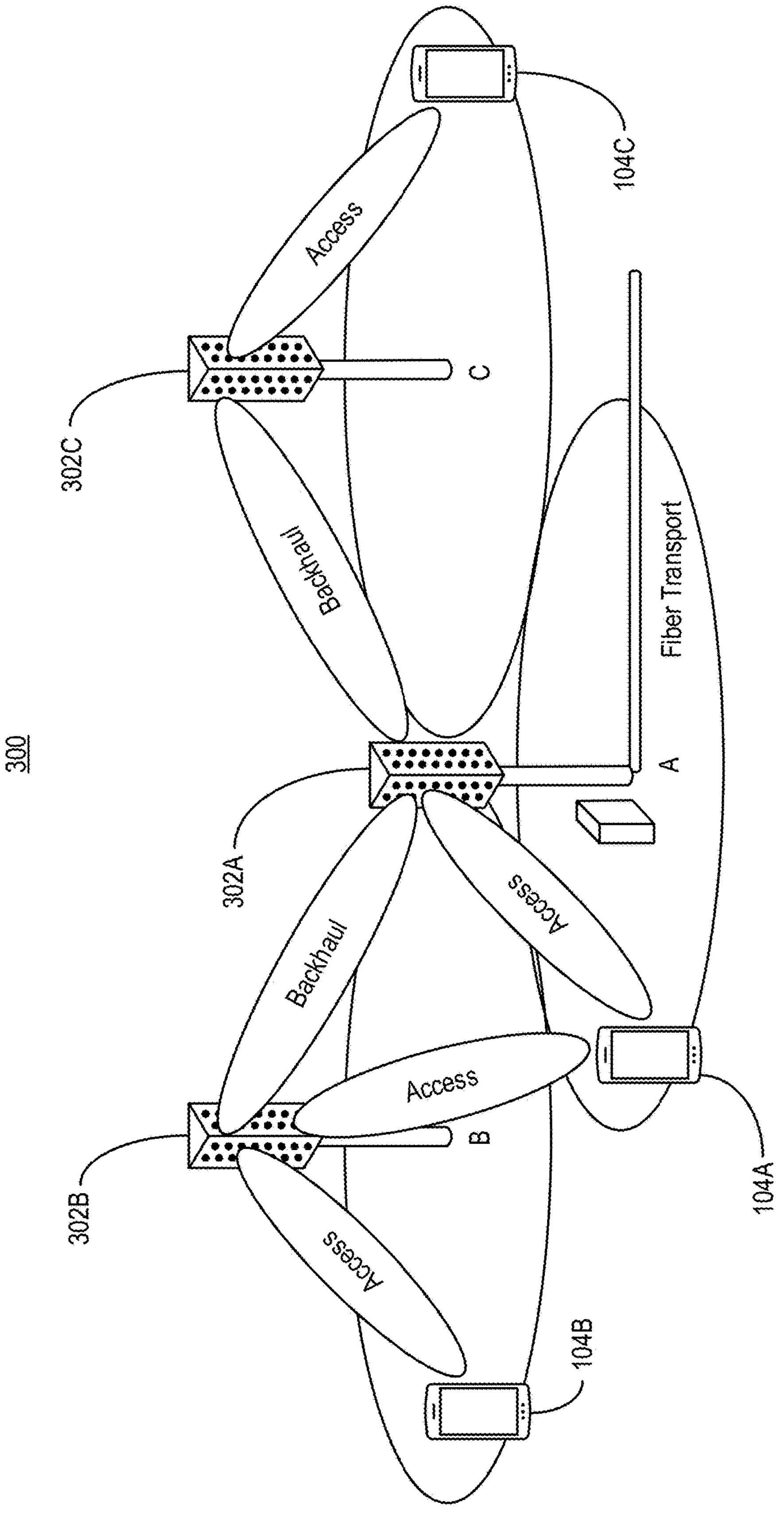
FIG. 3 illustrates an example of a network deployed with integrated access and backhaul links, in accordance with some embodiments of the present disclosure.

Referring to FIG. 3, depicted is an example of a network deployed with integrated access and backhaul links. In this example, three nodes 302 (e.g., access nodes accessed directly by one or more UEs 104), such as nodes A, B, and C (e.g., nodes 302A, 302B, and 302C), and three UEs 104 (e.g., UE 104A, UE 104B, and UE 104C) may be shown in FIG. 3. The nodes 302 may include or be referred to generally as a network node. In some cases, the nodes 302 can include or correspond to an IAB node. Each node 302 may correspond to at least one of an access node (e.g., a node 302 providing access to the UE 104) and/or a donor node (e.g., another node with a wired connection, such as for fiber transport, communicative to the access node via backhaul link). In some cases, the access node may correspond to a donor node, such as if the UE 104 connects directly to a node with fiber transport. The nodes 302 may include one or more features or functionalities similar to the BS 102 (or BS 202), such as described in conjunction with FIGS. 1-2. Individual UEs 104 can access a respective node A, B, C through an access link. For instance, UE 104A can access node 302A. UE 104B can access node 302B, and UE 104C can access node 302C via a respective access link.

In this example, a wired connection may be provided/included/implemented between the access node A (e.g., node 302A) and a core network, and the access nodes B and C may not include or be implemented with a wired connection with the core network element. In this case, the access node that supports the wireless access of the UE 104 and/or transmits data/information wirelessly may include, correspond to, or be referred to as an IAB node. The access node providing the wireless backhaul feature/function for the IAB node, such that the UE 104 can connect to and/or communicate with the core network (e.g., via fiber transport), may be called/referred to as an IAB donor (e.g., sometimes referred to generally as donor node or network node). In this example, access node A may be a donor node providing access to the core network to one or more UEs 104 accessing access nodes A or B.

The UE 104 can transmit data between the access nodes (e.g., node B to node A or node C to node A) through the wireless backhaul link. For example, the access node B may provide/transmit/send the data/information received/obtained/acquired from the UE 104 to the access node A through a wireless backhaul link (e.g., a first wireless backhaul link). The access node A, responsive to receiving the data from the access node B, can send/transmit the UE data to the core network element via fiber transport or the wired connection. For the downlink, the core network element may send the UE data packet (e.g., response packet or downlink packet) to the access node A. The access node A may receive the UE data from the core network. Responsive to the reception, the access node A can transmit the UE data to the access node B coupled to the UE 104 via/through the wireless backhaul link. Accordingly, the access node B can provide/send/transmit the UE data through the access link to the respective UE 104.

In certain systems, it may be challenging to satisfy/meet/accomplish the increasing demand for improvement in 5G cellular coverage, such as in outdoor and mobility scenarios. For example, in certain environments, the vehicles or mobile platforms may be equipped with mobile BS relays. The mobile platform may follow a certain known/predictable/predetermined/fixed itinerary/route/positioning (e.g., buses, trains, etc.), and/or situated in convenient/accessible locations (e.g., outside stadiums, hot-spot areas, or emergency sites, among others). Hence, the availability of the mobile platform equipped with the mobile BS relays can provide a boost in cellular coverage, capacity, and/or bandwidth at locations/positions or during a predetermined timeframe desired/needed.

The relays, such as using wireless backhaul toward the macro network, may offer improved network coverage and connectivity to neighboring UEs 104. The IAB-node (e.g., network node) can forward/transmit/send data by using wireless backhaul toward the macro network. Hence, mobile-IAB (or VMR-nodes), e.g., mounted on one or more mobile platforms, can be utilized/leveraged/implemented/adopted to provide coverage/capacity enhancement to onboard (e.g., the mobile platform) and/or surrounding UEs 104. Accordingly, the systems and methods of the technical solution discussed herein can provide one or more features, functionalities, operations, and/or mechanisms to enable mobile-IAB migration between donor-centralized units (CUs). The systems and methods can include IAB topology as described herein, such as in conjunction with at least FIGS. 4-5. As discussed herein, an IAB-donor (sometimes referred to as a donor node) may include or correspond to any network node connected to a core network. Further, a mobile IAB-node may include or correspond to any mobile node, such as a mobile BS relay or a vehicle-mounted relay, among others.

Figure 4:
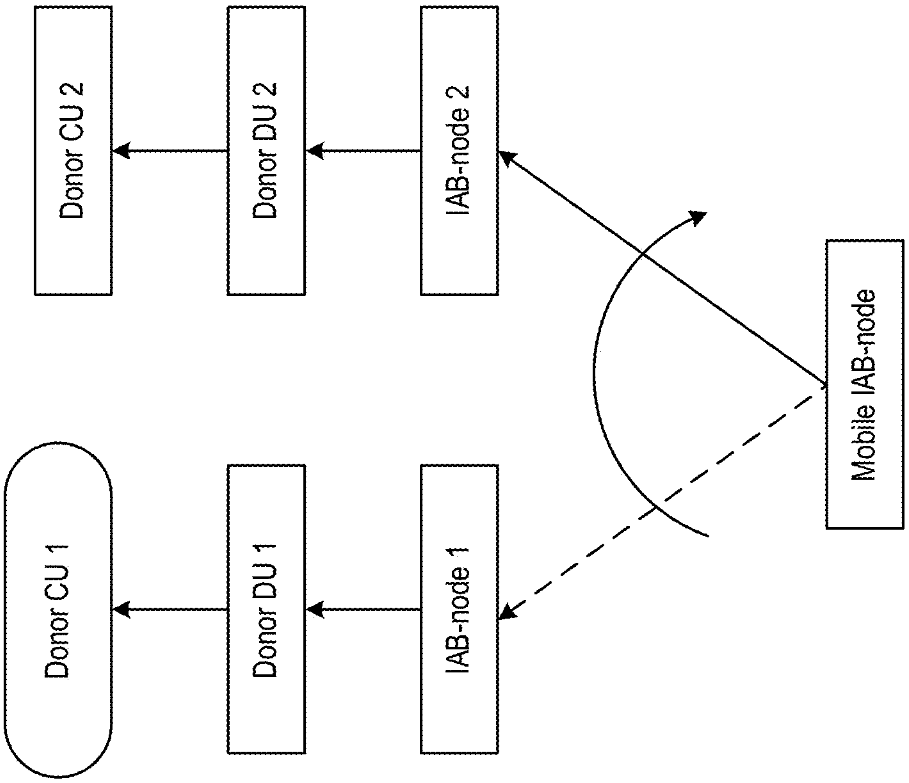
FIG. 4 illustrates an example of switching access between donor nodes once, in accordance with some embodiments of the present disclosure.

Referring to FIG. 4, depicted is an example of switching access between donor nodes once. The mobile IAB-node may access donor-CU 1 or an IAB-node 1 managed by the donor-CU 1 (e.g., a first/initial/original/source donor node or first donor-CU). Each IAB-node (e.g., IAB-node 1, IAB-node 2, etc.) may be at a fixed/predetermined location. Each IAB-node may include or be associated with a respective donor node (e.g., donor-CU and/or donor-DU). The mobile node can connect to at least one donor node via the respective IAB-node associated with the donor. The mobile IAB-node may be located/embedded/included/implemented on a mobile platform, such as a vehicle. The mobile IAB-node may traverse/move/relocate to a different position/location. With moving (e.g., as the mobile node transition to a different location), the link quality between mobile IAB-node and the parent node (e.g., in this case, the IAB-node 1) may decrease, and the mobile IAB-node may migrate/switch/move/transfer/reconnect to a new parent node (e.g., IAB-node 2, target donor node, or destination donor node). The donor CU can include/support a split configuration, such as a centralized unit control plane (CU-CP) and a centralized unit user plane (CU-UP). The CU-CP and CU-UP can include different features or functionalities. In some cases, the CU-CP may include one or more features or functionalities similar to the CU-UP, or vice versa.

Figure 5:
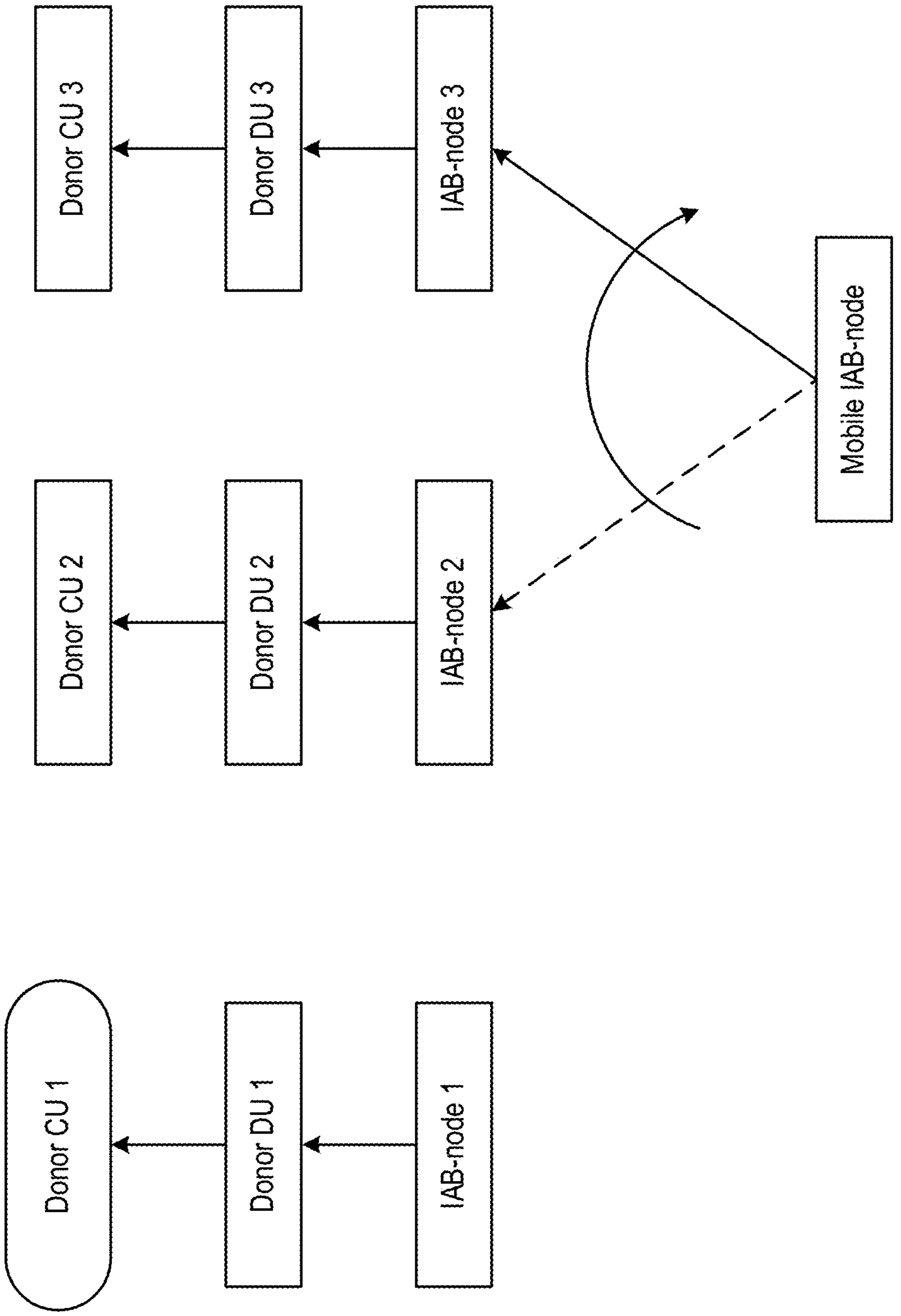
FIG. 5 illustrates another example of switching access between donor nodes more than once, in accordance with some embodiments of the present disclosure.

Further, FIG. 5 illustrates another example of switching access between donor nodes more than once. In some implementations, the mobile IAB-node may further move, such as from the IAB-node 2 to a different node. In this case, the node (e.g., mobile IAB-node) may migrate/switch to a third parent node (e.g., IAB-node 3) which is managed/controlled by donor-CU 3. In some cases, the intermediate node (e.g., IAB-nodes 1, 2, 3, etc., such as shown in FIG. 5) may or may not exist/be present/included. For instance, the mobile IAB-node may switch or migrate from an original donor node to a target donor node (or in some cases from an original IAB-node to a target IAB-node) with or without switching to intermediary node(s), such as moving from a first donor (e.g., donor DU 1 and/or donor CU 1) to a second donor (e.g., donor DU 2 and/or donor CU 2) to a third donor (e.g., donor DU 3 and/or donor CU 3).

1. Implementation 1

Figure 6A:
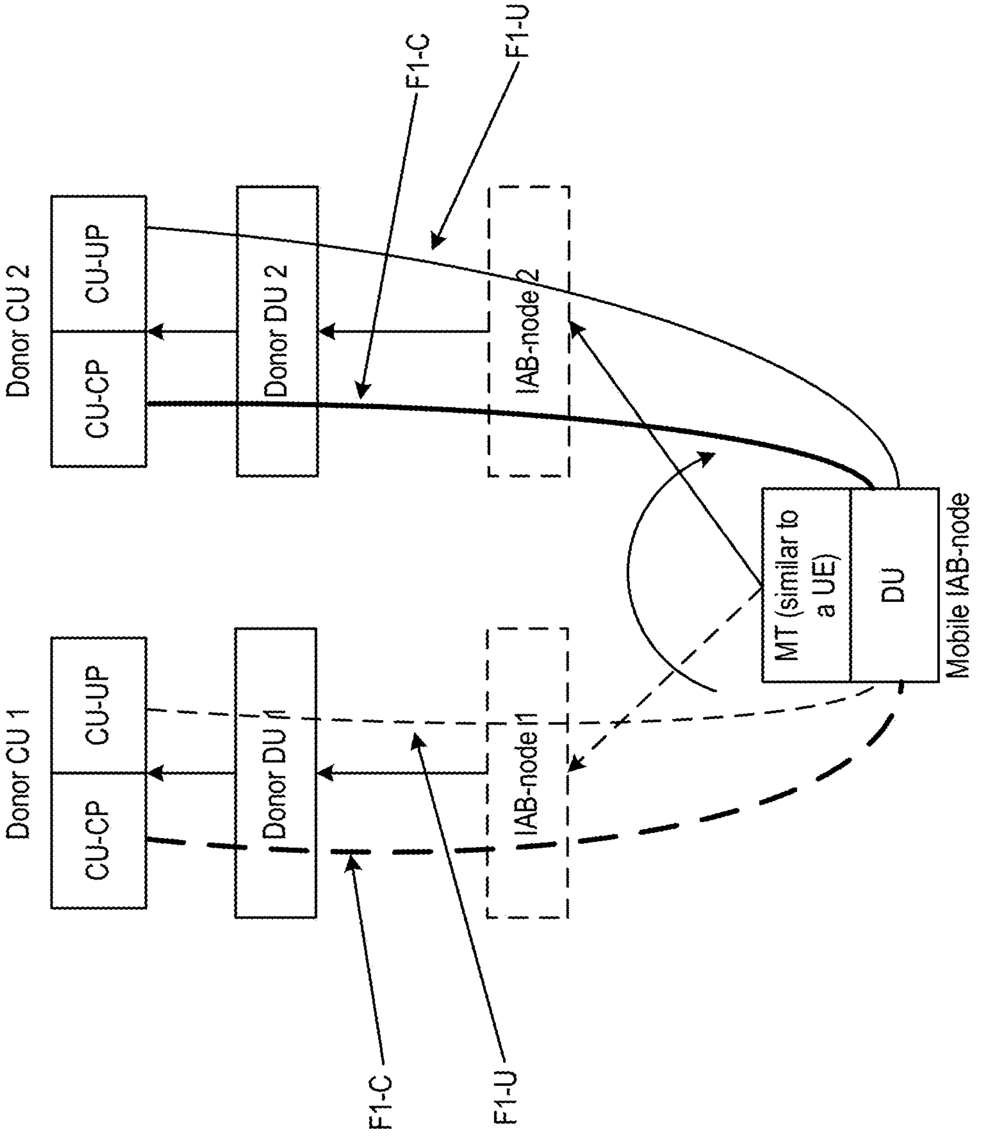
FIG. 6A illustrates an example of normal migration in certain systems, in accordance with some embodiments of the present disclosure.

Referring to FIG. 6A, depicted is an example of normal migration. In certain systems, if a mobile IAB-node migrates/switches to a new IAB-donor CU, the mobile IAB-node can set up/configure/initiate an F1 interface with the new IAB-donor-CU. For instance, the mobile IAB-node can perform/initiate/execute the F1 setup procedure/operation/instruction with the new IAB-donor CU-CP. In this example, an F1 control plane (F1-C) can switch from CU-CP of donor-CU 1 to CU-CP of donor-CU 2 (e.g., establish to the new IAB-donor). The tunnel-end-point of an F1 user plane (F1-U) tunnel to be established can be anchored at the new IAB-donor CU-UP (e.g., transition/migrate/move/switch from the CU-UP of the source donor (e.g., donor-CU 1) to the target donor (e.g., donor-CU 2)). The CU-CP can manage control plane data and the CU-UP can manage user plane data.

Figure 6B:
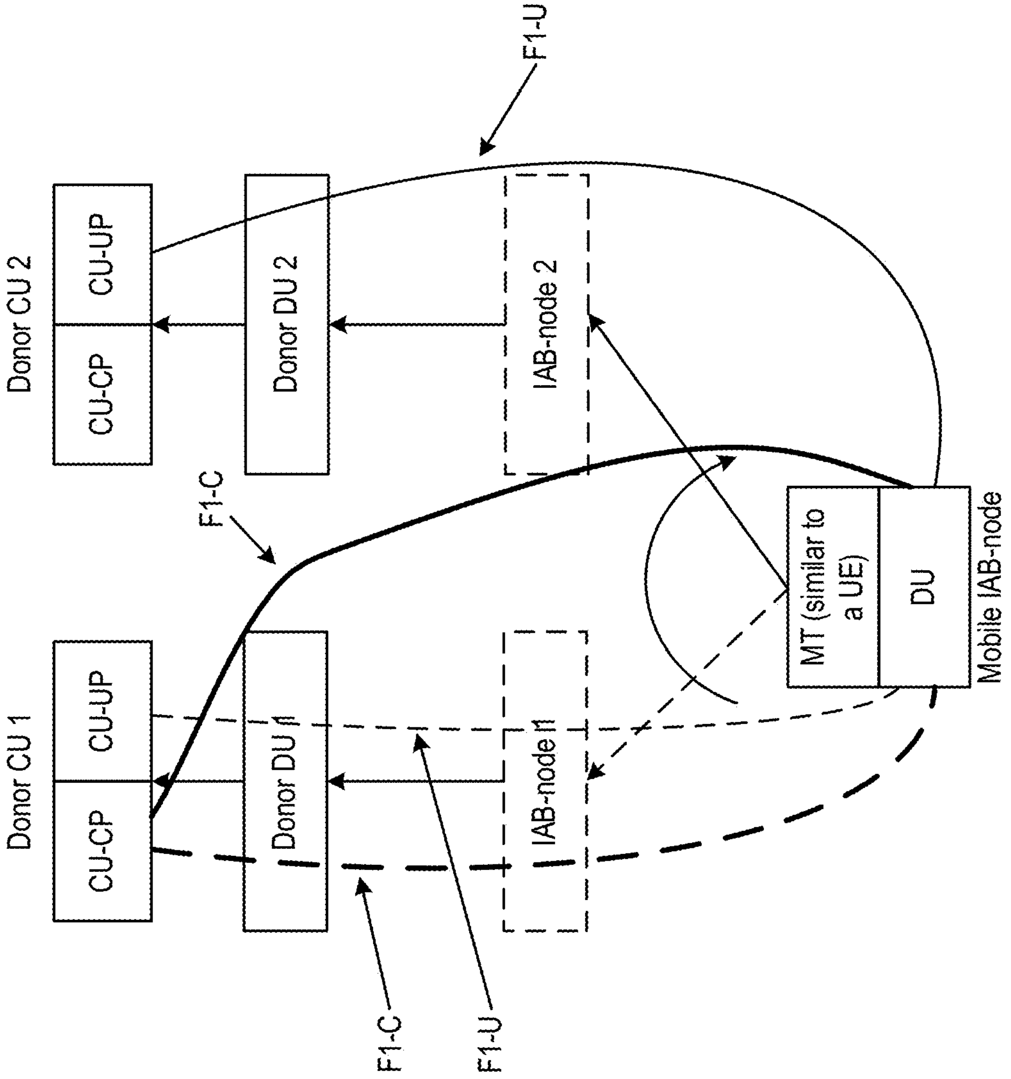
FIG. 6B illustrates an example of CU-UP sharing migration, in accordance with some embodiments of the present disclosure.

Referring now to FIG. 6B, depicted is an example of CU-UP sharing migration. In some implementations (e.g., in contrast to certain systems), a CU-UP sharing migration case, where F1-C connection of mobile IAB-DU can be kept/maintained/terminated at an initial or source IAB-donor CU-CP and the tunnel-end-point of F1-U tunnel can be anchored/migrated/established at a CU-UP of a new or target donor, may be considered. In some cases, certain IAB-donors may not support CU-UP sharing migration. In this case, the IAB-donors may exchange their respective capabilities/compatibility/support on the CU-UP sharing migration over Xn interface. For example, for CU-UP sharing, the F1-C connection of the mobile node can be maintained at a CU-CP of the source node or a previous node, and an F1-U tunnel of the mobile node can be maintained/established at a CU-UP of the target node or a new node (e.g., another donor), such as when the mobile node transitions/migrates/moves from the source node to access the target node.

In some cases, the mobile IAB-node may report/share/provide/send its capabilities to the CU on the CU-UP sharing migration via radio resource control (RRC) message or F1 application protocol (F1AP) message. The IAB-donor CU-UP may indicate/provide/send to the IAB-donor CU-CP its capability (or the capability of the mobile IAB-node) on the CU-UP sharing migration over E1 interface. The IAB-donor CU-CP can send CU-UP sharing migration capability to a network function or entity of a core network.

II. Implementation 2

Figure 7:
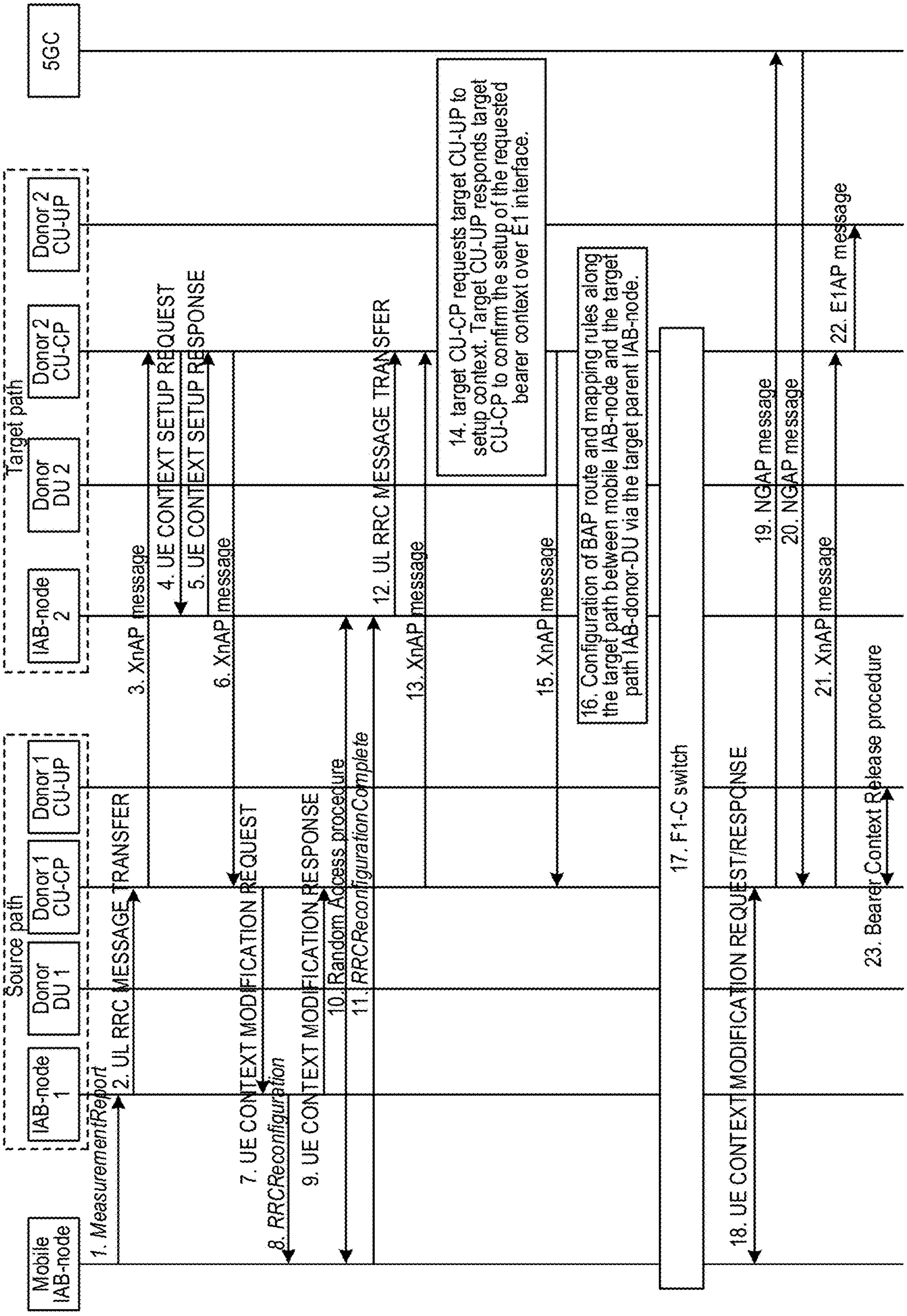
FIG. 7 illustrates a flow diagram of an example migration procedure for mobile IAB-node, in accordance with an embodiment of the present disclosure.

FIG. 7 illustrates a flow diagram of an example migration procedure for mobile IAB-node. In some implementations, the mobile node (e.g., mobile IAB-node) can perform/execute/initiate a migration procedure/process/operation/feature. Certain steps for the migration procedure may be shown in FIG. 7, for example.

At step 1, the mobile IAB-MT (e.g., similar to UE 104, sometimes referred to as mobile MT) can send a MeasurementReport message to the source parent node IAB-DU (e.g., source node DU). The report can be based on a measurement configuration that the mobile MT previously/historically received from the IAB-donor-CU 1. In some cases, the source node can include or correspond to a previous or most recent node connected by the mobile node. In some implementations, the IAB-node 1 may be a source node that the mobile node migrated from. At step 2, the source parent node IAB-DU may send a UL RRC message transfer message to the IAB-donor-CU 1 to convey the received MeasurementReport.

At step 3, the source IAB-donor-CU (e.g., the CU portion of the source node) can send/transmit/provide/indicate an XnAP message to the target IAB-donor-CU (e.g., CU portion of a target node). The target node can refer to the node that the mobile node is establishing/connecting to. The XnAP message may include at least one of an identity (ID) of the mobile node, itinerary (e.g., route, path, navigation, etc.) and/or speed (e.g., velocity, acceleration, etc.) of the mobile node (e.g., or the mobile platform including the mobile node), an indication that the mobile node is able to move/traverse/change position (e.g., indicated in the specification), CU-UP share indication, and/or IP address request for each usage for the mobile node.

The identity of the mobile node can be used to indicate/determine/identify the target donor-CU to be established/connected/accessed by the mobile node. The CU-UP shared indication can be used to indicate target IAB-donor CU that the F1-C connection is kept/maintained/established at source donor CU-CP and the F1-U tunnel is terminated/established/maintained at target donor CU-UP. The individual usages for the mobile node indicated/defined/provided can include or correspond to all traffic, F1-U, F1-C, and/or non-F1. Each usage of IP address request may include the number of requested IP address(es) and/or the type of requested IP address(es) (e.g., IPv4, IPv6/IPV6 prefix). In some cases, the IP address or IP prefix of the mobile IAB-node may be allocated by the source IAB-donor-CU.

At step 4, the target IAB-donor-CU may send/transmit/provide/indicate a UE CONTEXT SETUP REQUEST message to the target parent node IAB-DU to create the UE context for the migrating/switching/transferring IAB-MT and set up one or more bearers. The one or more bearers can be used by the migrating IAB-MT for its own signaling. In some cases, the one or more bearers can be used for the data traffic.

At step 5, the target parent node IAB-DU can respond to the target IAB-donor-CU (e.g., CU-CP) with a UE CONTEXT SETUP RESPONSE message. At step 6, the target IAB-donor-CU can perform/initiate/execute an admission control and provide/send/transmit a new RRC configuration as part of the XnAP message. Target donor-CU can send the XnAP message to source donor-CU, which may include a list of cells served by the BS 102 (e.g., gNB or wireless communication node), such as NR-PCI and/or NR CGI of each cell.

At step 7, the source IAB-donor-CU may send a UE CONTEXT MODIFICATION REQUEST message to the source parent node IAB-DU. This message may include/contain the received RRCReconfiguration message from the target IAB-donor-CU.

At step 8, the source parent node IAB-DU (e.g., DU of IAB-node 1) may forward/transmit/provide the received RRCReconfiguration message to the mobile IAB-MT (e.g., MT portion of the mobile node). Responsive to or subsequent to receiving the RRCReconfiguration message, the mobile IAB-node may report information to the source IAB-donor-CU. The information may include at least one of: F1-C and/or non-F1 IP address(es) (e.g., the IP address(es) may be used at the mobile node), DL transport layer address and/or DL tunnel endpoint identifier (TEID) associated to each general packet radio service (GPRS) tunneling protocol (GTP)-tunnel, and/or IP-Sec transport layer address and/or the associated GTP transport layer address (e.g., if IPsec is used).

At step 9, the source parent node IAB-DU can respond to the source IAB-donor-CU with the UE CONTEXT MODIFICATION RESPONSE message. At step 10, the mobile IAB-MT can perform a random access procedure. At step 11, the mobile IAB-MT can respond to the target parent node IAB-DU with an RRCReconfigurationComplete message.

At step 12, the target parent node IAB-DU may send a UL RRC MESSAGE TRANSFER message to the target IAB-donor-CU to convey/indicate/notify/alert the received RRCReconfigurationComplete message. Responsive to receiving the RRCReconfigurationComplete message, target CU-CP (e.g., CU-CP portion of the target node) may send an indication to source CU-CP (e.g., CU-CP portion of the source node). The indication can be used to inform the source CU-CP of the successful access of mobile IAB-node (e.g., the indication of successful access of the target node by the mobile node).

At step 13, the source IAB-donor-CU can send an XnAP message to the target IAB-donor-CU. The message can include, be, or correspond to a UE-associated message or a non-UE-associated message. The message can include information including at least one of: mobile node identity, UE identity, protocol data unit (PDU) session resources (e.g., a list of session resources) to be set up, DL transport layer address, DL TEID associated with each GTP-tunnel, and/or a CU-UP share indication. The CU-UP share indication can be used to indicate target IAB-donor CU that the F1-C connection is kept/maintained/established at source donor CU-CP and the F1-U tunnel is terminated/maintained at target donor CU-UP.

At step 14, the target CU-CP (e.g., CU-CP of the target node) can request the target CU-UP (e.g., CU-UP of the target node) to set up context for the one or more UEs 104 accessed/connected/coupled to the mobile node over the E1 interface. For example, the target CU-CP may send/indicate to the target CU-UP at least one of: an ID of the mobile node, an indication that the mobile node is able to move, a capability of the mobile node to support maintaining an F1-C connection of the mobile node at a particular network node that is different from that at which an F1-U tunnel of the mobile node is being maintained, and/or an indication that the F1-C connection of the mobile node is to be maintained at the CU-CP of the source node or a previous node, and the F1-U tunnel of the mobile node is to be maintained at the CU-UP of the target node, when the mobile node transitions from the source node to access the target node. For example, the F1-U tunnel of the mobile node is being maintained at a third node, the particular node may include or correspond to one of at least a first node, a second node, a fourth node, etc. The target CU-UP may respond to the target CU-CP to confirm the setup of the requested bearer context over the E1 interface.

At step 15, the target CU-CP can send an XnAP message to source CU-CP. The XnAP message can include at least one of a UE identity, mobile node identity, at least one of: data radio bearer (DRB) information, information on flows mapped to DRB, and/or UL transport network layer (TNL) information of each F1-U tunnel, at least one of: a list of protocol data unit (PDU) session resource(s) to be switched/migrated in DL, PDU session ID, DL next generation (NG) user plane interface (NG-U) user plane (UP) TNL Information, and/or a list of quality-of-service (QoS) flow accepted, and/or an ID of a centralized unit user plane (CU-UP) of the target node.

At step 16, the target IAB-donor-CU may configure backhaul (BH) RLC channels and backhaul adaptation protocol (BAP)-sublayer routing entries on the target path between the target parent IAB-node and target IAB-donor-DU and/or DL mappings on the target IAB-donor-DU for migrating IAB-node's target path. At step 17, the F1-C connections may be switched to use the new TNL address(es) of the mobile node.

At step 18, source IAB-donor-CU can send/transmit/provide UE CONTEXT MODIFICATION REQUEST message(s) to mobile node to update the UL BH information, UL TNL address, and/or in some cases, tunnel endpoint identifier (TEID) associated with each GTP-tunnel. One or more (or all) F1-U tunnels can be switched to utilize the mobile IAB-node's new TNL address(es). In some cases, the mobile IAB-node may update the DL transport layer address and/or DL TEID associated with each GTP-tunnel. The mobile node may report DL transport layer address and/or DL TEID associated with each GTP-tunnel to the source donor CU-CP.

At step 19, the source IAB-donor-CU may send a new generation application protocol (NGAP) message to 5GC (e.g., a network function or entity of a core network). The message may include at least one of: an identity (ID) or indication of the mobile node, UE ID, an indication that the mobile node is able to move, at least one of: a list of protocol data unit (PDU) session resources to be switched in downlink, a PDU session ID, a DL NG user plane interface (NG-U) user plane (UP) TNL information, and/or a list of QoS flow accepted, an indication that an F1 control plane (F1-C) connection of the mobile node is to be maintained/kept at a centralized unit control plane (CU-CP) of the source node or a previous node (e.g., most recent node) (e.g., source donor CU-CP), and/or an F1-U tunnel of the mobile node is to be maintained/terminated at a CU-UP of the target node (e.g., target donor CU-UP), when the mobile node transitions from the source node to access the target node, and/or an ID of the CU-UP of the target node.

At step 20, the 5GC can respond to source CU-CP with an NGAP message. The NGAP message may include at least one of: mobile node ID, UE ID, PDU session ID, and/or UL NG-U UP TNL information, among others. At step 21, the source CU-CP may send DL transport layer address and/or DL TEID associated with each GTP-tunnel to the target CU-CP over Xn interface. In some cases, the source CU-CP may send the information (e.g., NGAP message information) from 5GC to the target CU-CP over.

At step 22, the target CU-CP may send/provide/transmit, to the target CU-UP over E1 interface, at least one of: an ID of the mobile node, UE ID, at least one of: downlink transport layer address, and/or TEID associated with each GTP tunnel, PDU session ID, and/or UL NG-U UP TNL information. At step 23, a bearer context release procedure may be performed by the source node (e.g., source donor CU or between CU-CP and CU-UP portions of the source node) to release UE context at source CU-UPs. The source IAB-donor-CU may release BH RLC channels and/or BAP-sublayer routing entries on the source path between source parent IAB-node and source IAB-donor-DU.

In some implementations, FIG. 7 may include a 24th step (not shown). At step 24, responsive to or subsequent to the UE 104 getting off from/disconnecting from/terminating access to the mobile node, the UE 104 may access to a new IAB-node controlled by the target donor CU, since the user plane is terminated at the target CU-UP. For instance, the frequency of the cell belonging to or associated with the target donor CU can be set as a high priority by source donor-CU when configured to the UE 104.

III. Implementation 3

In some implementations, as described in conjunction with FIG. 5, a mobile node may migrate to a second donor (e.g., donor-CU 2, IAB-node 2, or a second network node), such as from a first donor (e.g., donor-CU 1, IAB-node 1, or a first network node). Subsequent to the move/migration, the mobile node may further migrate to donor-CU 3 (e.g., IAB-node 3, third donor, or a third network node). In this case, the donor-CU 2 may determine/decide to hand over/transfer the mobile IAB-MT (e.g., MT portion of the mobile node). In some cases, donor 1 may be referred to as a node, donor 2 may be referred to as a source node, and donor 3 may be referred to as a target node.

The one or more steps/process/procedures/operations discussed herein (e.g., steps of implementation 3) for migrating the mobile node (e.g., mobile IAB-node) to one or more donors may be similar to one or more steps of implementation 2, as described in conjunction with FIG. 7. For example, at step 1, the mobile IAB-MT may send/provide/transmit a MeasurementReport message to the source parent node IAB-DU (e.g., IAB-DU 2). The report may be based on a Measurement Configuration the mobile IAB-MT received from the IAB-donor-CU 2. At step 2, the source parent node IAB-DU may send a UL RRC message transfer message to the IAB-donor-CU 2 to convey the received MeasurementReport.

At step 3, IAB-donor-CU 2 can send an XnAP message to the IAB-donor-CU 3. In this case, the XnAP message may include at least one of: mobile node indication/identity (ID), itinerary and/or speed of the mobile node, IP address request for each usage for the mobile node, and/or the ID of the IAB-donor-CU (e.g., a first donor) that the mobile IAB-MT (e.g., mobile node) first accessed, or the F1-C of the mobile IAB-MT terminated to.

At step 4, the IAB-donor-CU 3 can send/provide/transmit a UE CONTEXT SETUP REQUEST message to the target parent node IAB-DU (e.g., IAB-DU 3), such as to create the UE context for the migrating IAB-MT and set up one or more bearers. At step 5, the target parent node IAB-DU may respond to the IAB-donor-CU 3 with a UE CONTEXT SETUP RESPONSE message. At step 6, the IAB-donor-CU 3 may perform/execute an admission control and provide the new RRC configuration as part of the XnAP message. Donor-CU 3 may send the XnAP message to donor-CU 2.

At step 7, the IAB-donor-CU 2 may send a UE CONTEXT MODIFICATION REQUEST message to the source parent node IAB-DU. This message may include the received RRCReconfiguration message from the IAB-donor-CU 3. At step 8, the source parent node IAB-DU can forward the received RRCReconfiguration message to the mobile IAB-MT. Responsive to receiving the RRCReconfiguration message, the mobile IAB-node may report to the IAB-donor-CU 1 at least one information of the one or more information similar to step 8, such as described in implementation 2.

At step 9, the source parent node IAB-DU can respond to the IAB-donor-CU 2 with the UE CONTEXT MODIFICATION RESPONSE message. Steps 10-11 may include one or more features or operations similar to steps 10-11 as described in conjunction with FIG. 7. At step 12, the target parent node IAB-DU may send/provide/transmit a UL RRC MESSAGE TRANSFER message to the IAB-donor-CU 3 to convey/indicate the received RRCReconfigurationComplete message. Subsequent to or responsive to receiving the RRCReconfigurationComplete message, the IAB-donor 3 CU-CP may send an indication to IAB-donor 1 CU-CP via Xn interface. The indication may be used to inform IAB-donor 1 CU-CP of the successful/completed access/establishment/connection of mobile IAB-node.

At step 13, the IAB-donor-CU 1 may provide/send an XnAP message to the IAB-donor-CU 3. The message may include one or more information (or a subset of information) similar to the XnAP message of step 13 described in conjunction with FIG. 7. In some cases, the message may not include certain information described in step 13 of FIG. 7, such as a CU-UP share indication, for example.

At step 14, the IAB-donor 3 CU-CP can request its CU-UP to set up context for the UEs accessed to the mobile IAB-node over E1 interface. The mobile IAB-node identity may be sent, such as along with the request. Responsive to sending the request and/or the mobile node ID, the CU-UP can respond to the IAB-donor 3 CU-CP to confirm the setup of the requested bearer context over E1 interface. This step may include one or more operations, procedures, or information similar to or as described in step 14 in conjunction with FIG. 7.

At step 15, the IAB-donor 3 CU-CP can send an XnAP message to the IAB-donor 1 CU-CP. In this case, the XnAP message may include at least one information of the information described in step 15 in conjunction with FIG. 7. In some cases, the XnAP message may not include at least one information described in step 15 in conjunction with FIG. 7, such as the target donor CU-UP ID. At step 16, the IAB-donor-CU 3 can perform/execute one or more features or operations similar to step 16 as described in conjunction with FIG. 7. Step 17 can be similar to step 17 as described in conjunction with FIG. 7.

At step 18, the IAB-donor-CU 1 can perform one or more features, processes, or operations similar to step 18 as described in conjunction with FIG. 7, such as sending the UE CONTEXT MODIFICATION REQUEST messages and/or receiving a report/indication of DL Transport Layer Address and/or DL TEID associated with/to each GTP-tunnel. At step 19, the IAB-donor-CU 1 can send an NGAP message to the 5GC, including at least one information (e.g., mobile node indication, UE ID, and/or at least one of: a list of PDU session resources, DL NG-U UP TNL information, and/or list of QoS flow accepted) similar to the information of step 19 in conjunction with FIG. 7.

At step 20, the 5GC may respond to the IAB-donor 1 CU-CP with an NGAP message, including at least one of: mobile node indication, UE ID, PDU Session ID, and/or UL NG-U UP TNL information. At step 21, the IAB-donor 1 CU-CP may send DL transport layer address and/or DL TEID associated with each GTP-tunnel, and in some cases, the information from 5GC (e.g., from step 20), to IAB-donor 3 CU-CP over Xn interface.

At step 22, the IAB-donor 3 CU-CP may send, to its CU-UP over E1 interface, at least one of the information similar to information of step 22 described in conjunction with FIG. 7. At step 23, the donor 1 CU-CP may send an XnAP message to donor 2 CU-CP to release/provide one or more (or all) contexts related to the mobile node. The donor 2 CU-CP can send/transmit an E1AP message to CU-UPs to release the context related to the mobile node. In some implementations, donor 3 CU-CP may send UE CONTEXT RELEASE REQUEST message to donor 2 CU-CP to release one or more context related to the mobile node.

IV. Implementation 4

In some implementations, as described in conjunction with FIG. 5, a mobile node may migrate/move to a second donor (e.g., donor-CU2) and subsequently move to a third donor (e.g., donor-CU3). The donor-CU 2 may determine/decide to hand over/transfer the mobile IAB-MT (e.g., MT portion of the mobile node). In this case, in contrast with at least implementation 2 and/or implementation 3, the first donor (e.g., donor 1 CU-CP) may not include/have an Xn interface with donor 3 CU-CP.

The one or more steps/process/procedures/operations discussed herein (e.g., steps of implementation 3) for migrating the mobile node (e.g., mobile IAB-node) to one or more donors may be similar to one or more steps of at least one of implementation 2, as described in conjunction with FIG. 7, and/or implementation 3. The one or more steps described herein may include one or more variations/differences to the one or more steps of implementation 2 and/or implementation 3. For example, step 1, the MeasurementReport message may be based on a measurement configuration the mobile IAB-MT received from the IAB-donor-CU 2. At step 2, the source parent node IAB-DU may send a UL RRC MESSAGE TRANSFER message to the IAB-donor-CU 2 to convey the received MeasurementReport.

At step 3, IAB-donor-CU 2 can send an XnAP message to the IAB-donor-CU 3. In this case, the XnAP message may include at least one of: mobile node indication/identity (ID), itinerary and/or speed of the mobile node, IP address request for each usage for the mobile node, and/or the IP address or IP prefix of the mobile node allocated by the source IAB-donor-CU, the ID of the IAB-donor-CU (e.g., a first donor) that the mobile IAB-MT (e.g., mobile node) first accessed, or the F1-C of the mobile IAB-MT terminated to, and/or an indication used to indicate IAB-donor-CU 3 that the IAB-donor-CU 2 is not the IAB-donor-CU that the mobile IAB-MT first accessed and/or the F1-C of the mobile IAB-MT terminated/maintained to.

At step 4, the IAB-donor-CU 3 can send a UE CONTEXT SETUP REQUEST message to the target parent node IAB-DU, similar to step 4 of implementation 2. Steps 5 and 6 can be performed similar to steps 5 and 6 of implementation 3, respectively, for example. Steps 7-11 can be executed/performed similarly to steps 8-12 of implementation 3, respectively.

At step 12, responsive to or subsequent to receiving/obtaining/acquiring the RRCReconfigurationComplete message, the IAB-donor 3 CU-CP (e.g., source node) can send/transmit/provide at least one of an indication that the mobile node has accessed the target node (e.g., success access of mobile node) and/or an identity of the target node to the IAB-donor 2 CU-CP (e.g., previous node). The IAB-donor 2 CU-CP may inform donor 1 CU-CP that the mobile node migrated/transferred/switched to another donor-CU. The IAB-donor 2 CU-CP may inform the identity of the donor-CU 3 (e.g., target node) to donor 1 CU-CP.

At step 13, the IAB-donor-CU 2 can perform similar operations of IAB-donor-CU 1, as described in implementation 3. At step 14, the IAB-donor 3 CU-CP can request the IAB-donor 3 CU-UP to set up context for the UEs 104 accessed to the mobile IAB-node over E1 interface. The mobile node ID may be sent along with the request. At step 15, the IAB-donor 3 CU-UP may respond to the IAB-donor 3 CU-CP to confirm the setup of the requested bearer context over the E1 interface. At step 16, the IAB-donor 3 CU-CP can send an XnAP message to the IAB-donor 2 CU-CP. The information of the XnAP message may include or be similar to information of the XnAP message described in step 15 of implementation 3. Subsequently or responsive to sending the XnAP message, the IAB-donor 2 CU-CP can forward at least one of the information of the XnAP message to donor 1 CU-CP. In some cases, the IAB-donor 2 CU-CP can indicate the target donor-CU ID to donor 1 CU-CP.

At step 17, the target IAB-donor-CU may configure BH RLC channels and BAP-sublayer routing entries on the target path between the target parent IAB-node and target IAB-donor-DU. The target IAB-donor-CU may configure DL mappings on the target IAB-donor-DU for the mobile IAB-node's target path.

At step 18, F1-C connections can be switched to use the mobile IAB-node's new TNL address(es). Source IAB-donor-CU may send UE CONTEXT MODIFICATION REQUEST messages to the mobile node to update the UL BH information. In some cases, the source IAB-donor-CU may send the UE CONTEXT MODIFICATION REQUEST messages to update UL FTEID associated with each GTP-tunnel. One or more (or all) F1-U tunnels may be switched to utilize the mobile node's new TNL address(es). In some cases, the mobile IAB-node may update DL FTEID associated with each GTP-tunnel. The mobile node may report DL transport layer address and/or DL TEID associated with each GTP-tunnel to source donor CU-CP.

At step 19, the IAB-donor-CU 1 may send a first NGAP message (e.g., NGAP message 1 to 5GC, including at least one of the information described in conjunction with step 19 of implementation 2 and/or implementation 3. At step 20, 5GC may respond to donor 1 CU-CP with a second NGAP message (e.g., NGAP message 2), including at least one of the information similar to step 20 of implementation 2 and/or implementation 3. At step 21, the donor 1 CU-CP may send DL Transport Layer Address and/or DL TEID associated with each GTP-tunnel to donor 2 (or donor 3) CU-CP over Xn interface. In some cases, the donor 1 CU-CP may send information from 5GC (e.g., from step 20) to the donor 2 (or donor 3) CU-CP over the Xn interface. Accordingly, donor 2 can forward/transmit/direct the received configuration to donor 3 CU-CP.

At step 22, the target CU-CP may send, to target CU-UP over E1 interface, at least one of the information described in step 22 of implementation 2 and/or implementation 3. Step 23 may be performed/executed similarly to step 23 of implementation 3.

Figure 8:
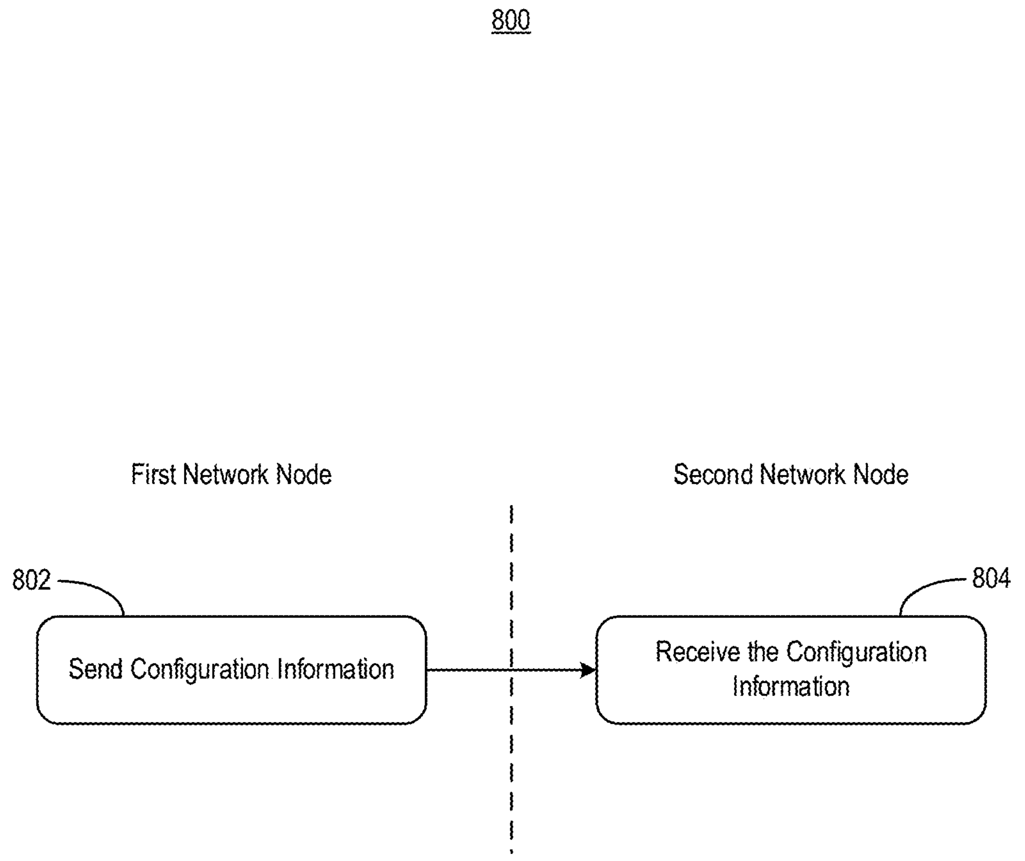
FIG. 8 illustrates a flow diagram of an example method for mobile node inter-CU migration, in accordance with an embodiment of the present disclosure.

Referring to FIG. 8, depicted is a flow diagram of a method 800 for mobile node inter-CU migration. The method 800 can be implemented using any of the components and devices detailed herein in conjunction with FIGS. 1-7. In overview, the method 800 can include sending configuration information (802). The method 800 can include receiving the configuration information (804).

At operation (802), a first network node can send configuration information to a second network node. The configuration information may be associated with a mobile node (e.g., mobile IAB-node) transitioning from a source node to a target node (e.g., target/new IAB-donor). The configuration information may include/indicate/provide a capability/configuration information to support maintaining an F1 control plane (F1-C) connection of a mobile node at a centralized unit control plane (CU-CP) of the source IAB-donor, such as when the mobile node transitions from the source donor to access the target donor. At operation (804), the second network node can receive the configuration from the first network node. The configuration information can include the capability of the sender, such as the first network node capability.

In some implementations, the first network node can include or correspond to the source node, and the second network node can include or correspond to the target node. In some cases, the first network node may include the target node, and the second network node may include the source node. In some cases, the first network node can include the mobile node, and the second network node can include the source node or the target node. In some other cases, the first network node can include the source node or the target node, and the second network node can include the mobile node.

In some cases, the source node may send at least one information to the target node. For instance, the source node may send at least one of an identity (ID) of the mobile node, an indication of the mobile node that is to access the target node, a speed of the mobile node (e.g., speed of the mobile platform that includes the mobile node), a capability of the mobile node to support maintaining an F1 control plane (F1-C) connection (sometimes referred to generally as a connection) of the mobile node at a particular network node that is different from that at which an F1 user plane (F1-U) tunnel (sometimes referred to generally as a tunnel) of the mobile node is being maintained, and/or an indication that the F1-C connection of the mobile node is to be maintained at a centralized unit control plane (CU-CP) of the source node or a previous node, and an F1-U tunnel of the mobile node is to be maintained at a centralized unit user plane (CU-UP) of the target node, when the mobile node transitions from the source node to access the target node. In some cases, the connection (e.g., F1-C) and the tunnel (e.g., F1-U) may be the same in one or more aspects. In some other cases, the connection and the tunnel may be different in one or more aspects.

In some implementations, the source node can receive, from the mobile node, at least one of: at least one of: a transport layer address for F1 or non-F1 traffic communication, at least one of: a downlink (DL) transport layer address, or a downlink tunnel endpoint identifier (TEID) associated with each general packet radio service (GPRS) tunneling protocol (GTP) tunnel, and/or at least one of: an IP security (IP-SEC) transport layer address, or a GTP transport layer address associated with the IP-SEC transport layer address. In some cases, the source node may receive an indication of successful access of the target node by the mobile node from the target node.

In some implementations, the source node may send/transmit/provide an Xn application protocol (XnAP) message comprising first information to the target node. The first information comprises at least one of: an identity (ID) of the mobile node, an indication that the mobile node is able to move, an identity of a user equipment (UE), a list of protocol data unit (PDU) session resources to be setup, a downlink transport layer address, a downlink tunnel endpoint identifier (TEID) associated to each general packet radio service (GPRS) tunneling protocol (GTP) tunnel, a capability of the mobile node to support maintaining a F1 control plane (F1-C) connection of the mobile node at a particular network node that is different from that at which a F1 user plane (F1-U) tunnel of the mobile node is being maintained, and/or an indication that the F1-C connection of the mobile node is to be maintained at a centralized unit control plane (CU-CP) of the source node or a previous node, and a F1-U tunnel of the mobile node is to be maintained at a centralized unit user plane (CU-UP) of the target node, when the mobile node transitions from the source node to access the target node.

In some implementations, a centralized unit control plane (CU-CP) of the target node may send to a centralized unit user plane (CU-UP) of the target node at least one of: an ID of the mobile node, an indication that the mobile node is able to move, a capability of the mobile node to support maintaining an F1-C connection of the mobile node at a particular network node that is different from that at which an F1-U tunnel of the mobile node is being maintained, and/or an indication that the F1-C connection of the mobile node is to be maintained at the CU-CP of the source node or a previous node, and the F1-U tunnel of the mobile node is to be maintained at the CU-UP of the target node, when the mobile node transitions from the source node to access the target node. In some cases, the particular network node may include at least one of the source node, the target node, and/or a previous node.

In some implementations, the source node may receive from the target node at least one of: a mobile node ID, a UE ID (e.g., ID of the UE), at least one of: data radio bearer (DRB) information, information on flows mapped to DRB, or uplink transport network layer (TNL) information of each F1-U tunnel, at least one of: a list of protocol data unit (PDU) session resources to be switched in downlink, a PDU session ID, a downlink next generation (NG) user plane interface (NG-U) user plane (UP) TNL information, or a list of quality-of-service (QoS) flow accepted, and/or an ID of a centralized unit user plane (CU-UP) of the target node.

In some implementations, the source node may send to a network function or entity of a core network at least one of: a mobile node ID, an indication that the mobile node is able to move, a UE ID, at least one of: a list of PDU session resources to be switched in downlink, a PDU session ID, a downlink NG-U UP TNL information, or a list of QoS flow accepted, an indication that an F1-C connection of the mobile node is to be maintained at a CU-CP of the source node or a previous node, and an F1-U tunnel of the mobile node is to be maintained at a CU-UP of the target node, when the mobile node transitions from the source node to access the target node, and/or an ID of the CU-UP of the target node.

In some cases, the CU-CP of the target node can send to the CU-UP of the target node at least one of: a mobile device ID, a UE ID, at least one of: downlink transport layer address, or a tunnel endpoint identifier (TEID) associated to/with each general packet radio service (GPRS) tunneling protocol (GTP) tunnel, PDU session ID, and/or an uplink NG-U UP TNL information. In some cases, the source node (e.g., a second donor or donor 2) may send, to the target node (e.g., a third donor or donor 3), an identity of a node (e.g., donor 1 or a first donor) that the mobile node initially accessed, or an identity of a node at which an F1-C of the mobile node (e.g., mobile IAB-MT) is terminated/maintained.

In certain cases, the node may receive an indication of successful access of the target node by the mobile node from the target node. In some implementations, the source node may receive an Xn application protocol (XnAP) message to release context related to the mobile node or a wireless communication device from a previous node (e.g., donor 1). The previous node may include a node that the mobile node initially accessed, or a node at which a F1-C interface of the mobile node (e.g., IAB-MT) is terminated/maintained/connected (e.g., at an endpoint of a connection).

In some implementations, the target node can send to the source node to release the context related to the mobile node and/or a wireless communication device (e.g., UE). In some implementations, the source node may send to a previous node at least one of: an indication that the mobile node has accessed the target node, and/or an identity of the target node. The previous node may include a node that the mobile node initially/originally accessed, or a node at which an F1-C of the mobile node is terminated/maintained.

Figure 9:
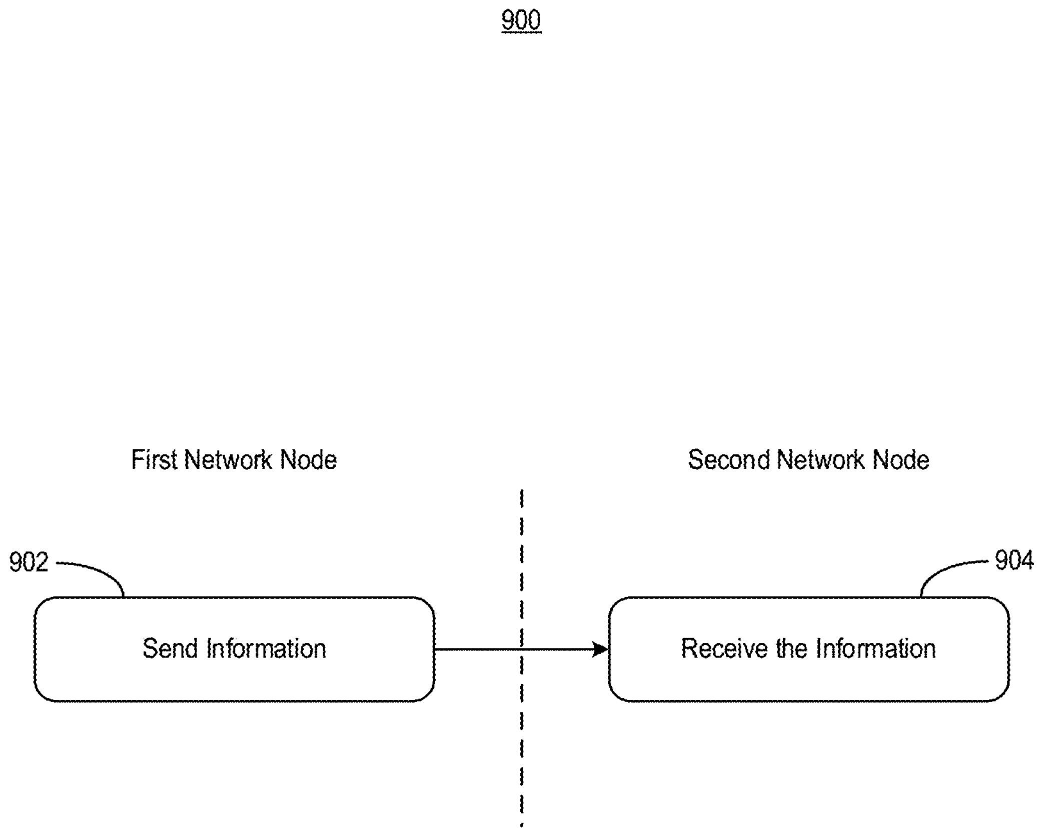
FIG. 9 illustrates a flow diagram of an example method for non-migration of F1-C connection, in accordance with an embodiment of the present disclosure.

FIG. 9 illustrates a flow diagram of a method 900 for non-migration of F1-C connection. The method 900 can be implemented using any of the components and devices detailed herein in conjunction with FIGS. 1-7. In overview, the method 900 can include sending information (902). The method 900 can include receiving information (904).

At operation (902), a first network node can send information to a second network node. The information may include a capability of the first network node to support maintaining an F1 control plane (F1-C) connection of a third node at a fourth network node that is different from that at which an F1 user plane (F1-U) tunnel of the third node is being maintained/established/terminated. At operation (904), the second network node can receive the information sent from the first network node.

In some implementations, the first network node may include or correspond to a centralized unit user plane (CU-UP) of a radio access network (RAN) node, and the second network node may include a centralized unit control plane (CU-CP) of the RAN node. In some cases, the first network node can include a CU-CP of the RAN node, and the second network node can include a network function or entity of a core network. In some cases, the third node can include a mobile node. In certain cases, the fourth node may include the first network node or the second network node. In some implementations, the fourth node may be different from the first network node and/or the second network node.

In certain implementations, the first or the second node from or corresponding to the third network node may receive a first capability of the third network node. In some cases, the first capability may include/indicate a capability to support maintaining an F1-C of the third node at a particular network node that is different from that at which an F1-U tunnel of the third node is being maintained/established. In this case, the particular network node can include or correspond to one of at least the first node, the second node, or the fourth node, for example. In some implementations, receiving the first capability of the third node may include receiving the first capability via an RRC message or a F1 application protocol (F1AP) message.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method, comprising:

sending, by a first network node to a second network node, configuration information, wherein the configuration information is associated with a mobile node transitioning from a source node to a target node, and wherein, when the mobile node transitions from the source node to access the target node, the configuration information comprises at least one of:

a capability of the mobile node to support maintaining a F1 control plane (F1-C) connection of the mobile node at a particular network node that is different from that at which a F1 user plane (F1-U) tunnel of the mobile node is being maintained, or an indication that the F1-C connection of the mobile node is to be maintained at a centralized unit control plane (CU-CP) of the source node or a previous node, and a F1-U tunnel of the mobile node is to be maintained at a centralized unit user plane (CU-UP) of the target node.

2. The method of claim 1, wherein:

the first network node comprises the source node, and the second network node comprises the target node; or the first network node comprises the target node, and the second network node comprises the source node; or the first network node comprises the mobile node, and the second network node comprises the source node or the target node; or the first network node comprises the source node and the second network node comprises the mobile node; or the first network node comprises the target node and the second network node comprises the mobile node.

3. The method of claim 1, comprising:

sending, by the source node, to the target node, at least one of:

an identity (ID) of the mobile node, an indication of the mobile node that is to access the target node, or a speed of the mobile node.

4. The method of claim 1, comprising:

receiving, by the source node from the mobile node, at least one of:

at least one of: a transport layer address for F1 or non-F1 traffic communication, at least one of: a downlink transport layer address, or a downlink tunnel endpoint identifier (TEID) associated with each general packet radio service (GPRS) tunneling protocol (GTP) tunnel, or at least one of: an IP security (IP-SEC) transport layer address, or a GTP transport layer address associated with the IP-SEC transport layer address.

5. The method of claim 1, comprising:

receiving, by the source node, from the target node, an indication of successful access of the target node by the mobile node.

6. The method of claim 1, comprising:

sending, by the source node, to the target node, an Xn application protocol (XnAP) message comprising first information.

7. The method of claim 6, wherein the first information comprises at least one of:

an identity (ID) of the mobile node, an indication that the mobile node is able to move, an identity of a user equipment (UE), a list of protocol data unit (PDU) session resources to be setup, a downlink transport layer address, a downlink tunnel endpoint identifier (TEID) associated to each general packet radio service (GPRS) tunneling protocol (GTP) tunnel, a capability of the mobile node to support maintaining a F1 control plane (F1-C) connection of the mobile node at a particular network node that is different from that at which a F1 user plane (F1-U) tunnel of the mobile node is being maintained, or an indication that the F1-C connection of the mobile node is to be maintained at a centralized unit control plane (CU-CP) of the source node or a previous node, and a F1-U tunnel of the mobile node is to be maintained at a centralized unit user plane (CU-UP) of the target node, when the mobile node transitions from the source node to access the target node.

8. The method of claim 6, wherein a centralized unit control plane (CU-CP) of the target node sends to a centralized unit user plane (CU-UP) of the target node at least one of:

an identity (ID) of the mobile node, an indication that the mobile node is able to move, a capability of the mobile node to support maintaining a F1 control plane (F1-C) connection of the mobile node at a particular network node that is different from that at which a F1 user plane (F1-U) tunnel of the mobile node is being maintained, or an indication that the F1-C connection of the mobile node is to be maintained at the CU-CP of the source node or a previous node, and the F1-U tunnel of the mobile node is to be maintained at the CU-UP of the target node, when the mobile node transitions from the source node to access the target node.

9. The method of claim 3, wherein the particular network node comprises: the source node, the target node or a previous node.

10. The method of claim 1, comprising:

receiving, by the source node, from the target node, at least one of:

an identity (ID) of the mobile node, an ID of a user equipment (UE), at least one of: data radio bearer (DRB) information, information on flows mapped to DRB, or uplink transport network layer (TNL) information of each F1 user plane (F1-U) tunnel, at least one of: a list of protocol data unit (PDU) session resources to be switched in downlink, a PDU session ID, a downlink next generation (NG) user plane interface (NG-U) user plane (UP) TNL information, or a list of quality-of-service (QoS) flow accepted, or an ID of a centralized unit user plane (CU-UP) of the target node.

11. The method of claim 1, comprising:

sending, by the source node, to a network function or entity of a core network, at least one of:

an identity (ID) of the mobile node, an indication that the mobile node is able to move, an ID of a user equipment (UE), at least one of: a list of protocol data unit (PDU) session resources to be switched in downlink, a PDU session ID, a downlink next generation (NG) user plane interface (NG-U) user plane (UP) TNL information, or a list of quality-of-service (QoS) flow accepted, an indication that a F1 control plane (F1-C) connection of the mobile node is to be maintained at a centralized unit control plane (CU-CP) of the source node or a previous node, and a F1-U tunnel of the mobile node is to be maintained at a centralized unit user plane (CU-UP) of the target node, when the mobile node transitions from the source node to access the target node, or an ID of the CU-UP of the target node.

12. The method of claim 1, wherein the CU-CP of the target node sends to the CU-UP of the target node at least one of:

an identity (ID) of the mobile node, an ID of a user equipment (UE), at least one of: downlink transport layer address, or a tunnel endpoint identifier (TEID) associated to each general packet radio service (GPRS) tunneling protocol (GTP) tunnel, a protocol data unit (PDU) session ID, or an uplink next generation (NG) user plane interface (NG-U) user plane (UP) TNL information.

13. The method of claim 1, comprising:

sending, by the source node, to the target node: an identity of a node that the mobile node initially accessed, or an identity of a node at which a F1 control plane interface (F1-C) of the mobile node is terminated.

14. The method of claim 13, comprising:

receiving, by the node, from the target node, an indication of successful access of the target node by the mobile node.

15. The method of claim 1, comprising:

receiving, by the source node, from a previous node, an Xn application protocol (XnAP) message to release context related to the mobile node or a wireless communication device, wherein the previous node comprises a node that the mobile node initially accessed, or a node at which a F1 control plane interface (F1-C) of the mobile node is terminated.

16. The method of claim 15 comprising:

sending, by the target node, to the source node to release the context related to the mobile node or a wireless communication device.

17. The method of claim 1, comprising:

sending, by the source node, to a previous node at least one of:

an indication that the mobile node has accessed the target node, or an identity of the target node, wherein the previous node comprises a node that the mobile node initially accessed, or a node at which a F1 control plane interface (F1-C) of the mobile node is terminated.

18. A method, comprising:

receiving, by a second network node from a first network node, configuration information, wherein the configuration information is associated with a mobile node transitioning from a source node to a target node, and wherein, when the mobile node transitions from the source node to access the target node, the configuration information comprises at least one of:

a capability of the mobile node to support maintaining a F1 control plane (F1-C) connection of the mobile node at a particular network node that is different from that at which a F1 user plane (F1-U) tunnel of the mobile node is being maintained, or an indication that the F1-C connection of the mobile node is to be maintained at a centralized unit control plane (CU-CP) of the source node or a previous node, and a F1-U tunnel of the mobile node is to be maintained at a centralized unit user plane (CU-UP) of the target node.

19. A first network node, comprising:

at least one processor configured to:

send, via a transmitter to a second network node, configuration information, wherein the configuration information is associated with a mobile node transitioning from a source node to a target node, and wherein, when the mobile node transitions from the source node to access the target node, the configuration information comprises at least one of:

a capability of the mobile node to support maintaining a F1 control plane (F1-C) connection of the mobile node at a particular network node that is different from that at which a F1 user plane (F1-U) tunnel of the mobile node is being maintained, or an indication that the F1-C connection of the mobile node is to be maintained at a centralized unit control plane (CU-CP) of the source node or a previous node, and a F1-U tunnel of the mobile node is to be maintained at a centralized unit user plane (CU-UP) of the target node.

20. A second network node, comprising:

at least one processor configured to:

receive, via a receiver from a first network node, configuration information, wherein the configuration information is associated with a mobile node transitioning from a source node to a target node, and wherein, when the mobile node transitions from the source node to access the target node, the configuration information comprises at least one of:

a capability of the mobile node to support maintaining a F1 control plane (F1-C) connection of the mobile node at a particular network node that is different from that at which a F1 user plane (F1-U) tunnel of the mobile node is being maintained, or an indication that the F1-C connection of the mobile node is to be maintained at a centralized unit control plane (CU-CP) of the source node or a previous node, and a F1-U tunnel of the mobile node is to be maintained at a centralized unit user plane (CU-UP) of the target node.

* * * * *